US012445496B2

(12) United States Patent
Swaminathan (10) Patent No.: US 12,445,496 B2
(45) Date of Patent: Oct. 14, 2025

(54) ENHANCING EMAIL SECURITY BY CONSOLIDATING EMAIL POLICY MANAGEMENT

(71) Applicant: Kishore Swaminathan, Willowbrook, IL (US)

(72) Inventor: Kishore Swaminathan, Willowbrook, IL (US)

( * ) Notice: Subject to any disclaimer, the term of this patent is extended or adjusted under 35 U.S.C. 154(b) by 96 days.

(21) Appl. No.: 18/199,965

(22) Filed: May 21, 2023

(65) Prior Publication Data

US 2024/0388605 A1    Nov. 21, 2024

(51) Int. Cl.
*H04L 9/40* (2022.01)
*H04L 51/48* (2022.01)
*H04L 61/4511* (2022.01)

(52) U.S. Cl.
CPC .............. *H04L 63/20* (2013.01); *H04L 51/48* (2022.05); *H04L 61/4511* (2022.05)

(58) Field of Classification Search
None
See application file for complete search history.

(56) References Cited

U.S. PATENT DOCUMENTS

| | | | |
|---|---|---|---|
| 7,313,700 B2* | 12/2007 | Delany | H04L 9/0891 713/180 |
| 7,987,251 B2* | 7/2011 | Blinn | H04L 61/3015 709/223 |
| 11,368,494 B2* | 6/2022 | Goldstein | H04L 63/14 |
| 2006/0031325 A1* | 2/2006 | Cheng | H04L 51/212 709/206 |
| 2021/0092123 A1* | 3/2021 | Zahed | H04L 63/0236 |
| 2021/0289001 A1* | 9/2021 | Wilson | H04L 63/101 |
| 2022/0038504 A1* | 2/2022 | Goldstein | H04L 61/4511 |
| 2024/0291839 A1* | 8/2024 | Yagnik | H04L 51/214 |
| 2024/0314163 A1* | 9/2024 | Gopathy | G06V 30/19 |

* cited by examiner

*Primary Examiner* — Younes Naji (57) ABSTRACT

Via a DNS record, an Internet domain designates a website as a Domain Email Authority (DEA): a consolidated entity that collects, validates, and stores all email-related policies of the domain to distribute them to the DNS, email servers, email clients, and end-users. Simple embodiments of this invention can be implemented without changes to existing email standards, servers, or clients, and can provide considerable benefits such as enhanced security and reduced spam. Also described are more advanced embodiments that can be introduced gradually through small modifications to specific standards, protocols, and specific components of email servers and clients. Given that the email standard is mature and highly resistant to change, the DEA is designed to be an inexpensive means for experimenting with new email features such that new features do not require significant changes or end-to-end adoption by the entire email ecology.

17 Claims, 8 Drawing Sheets

AUTHORIZATION FOR INTERNET COMMUNICATIONS IN A PATENT APPLICATION OR REQUEST TO WITHDRAW AUTHORIZATION FOR INTERNET COMMUNICATIONS

| | |
|---|---|
| Application No. | |
| Filing Date | |
| First Named Inventor | |
| Art Unit | |
| Examiner Name | |
| Practitioner Docket No. | |

To: Commissioner for Patents
P.O. Box 1450
Alexandria, VA 22313-1450

I. To authorize permission for Internet Communications.

☐ Recognizing that Internet communications are not secure, I hereby authorize the USPTO to communicate with the undersigned and practitioners in accordance with 37 CFR 1.33 and 37 CFR 1.34 concerning any subject matter of this application via video conferencing, instant messaging, or electronic mail. I understand that a copy of these communications will be made of record in the application file. (MPEP 502.03)

I am the

☐ applicant.

☐ attorney or agent of record. Registration number __________

☐ attorney or agent acting under 37 CFR 1.34. Registration number __________

______________________    ______________________
Signature                  Date

Prior Art

Fig. 01

DNS

| Email Feature 1 |
| Email Feature 2 |
| Email Feature 3 |
| Email Feature 4 |

(e.g., SPF, DKIM, DMARC, DMIM)

Prior Art

Fig. 02

Architecture of email server iRedMail

Prior Art

Fig. 03

| Type | Domain/Name/Host | Value/Data |
|---|---|---|
| A | dea.example.com | *IP address of dea.example.com* |
| TXT | example.com | v=DEA1;l=https://dea.example.com |

DNS Record for example.com designating its DEA
as a consolidated email policy repository

| Username | Password | Organization | Role |
|---|---|---|---|
| kathy@example.com | xxxxxxx | Internal | sourcer |
| ajay@seo.in | xxxxxx | seo.in | targeter, policyadmin |
| luka@swe.ua | xxxxxxx, jwt-xxxxx | swe.ua | serveradmin |

← 702

| Role | Privileges |
|---|---|
| sourcer | add_user, grant_privileges, delete_privileges |
| targeter | send: address_list={cc_uk_prospects} |
| policyadmin | dmarc_access, server_sourcing |
| serveradmin | set_spf, set_dkim, validate, no_dmarc, api |

ENHANCING EMAIL SECURITY BY CONSOLIDATING EMAIL POLICY MANAGEMENT

FIELD OF INVENTION

This invention is in the fields of email, email policies, DNS, authentication, and security. It describes systems and methods that enable email policies of a domain to be managed holistically, leading to better email security.

BACKGROUND

Figure 01:
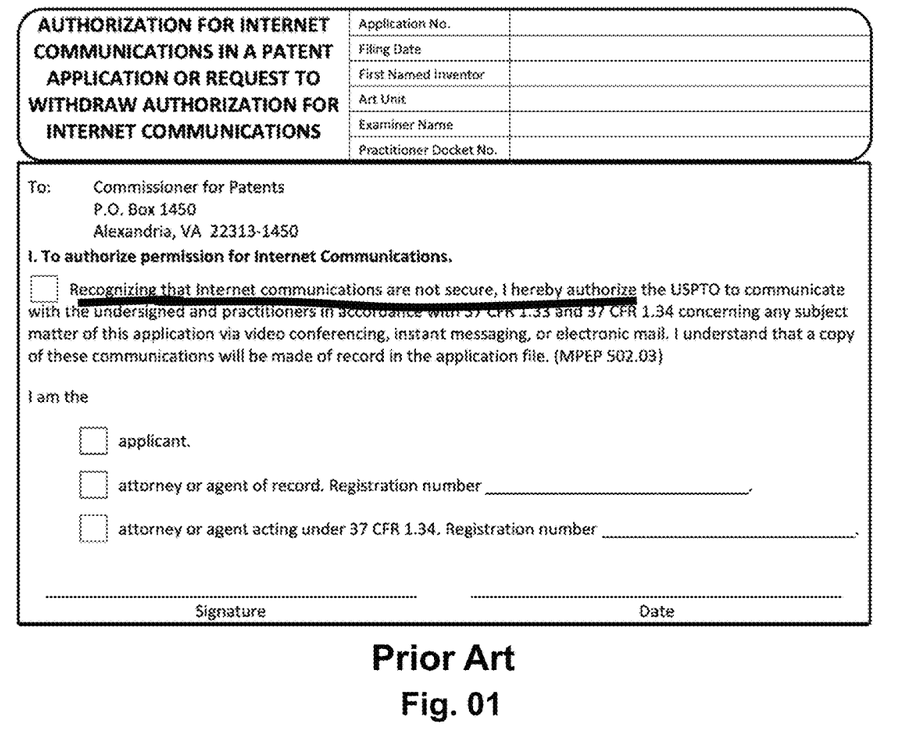

Well over half a century after its invention and a quarter century after its mass adoption, email is still not considered a secure means of communication. Financial institutions, governments, hospitals, and an ever-growing list of companies and institutions shun the use of email for sensitive and urgent communication with consumers. It is worth noting that the US Patent Office has a special form that requires applicants to authorize email communication from USPTO by acknowledging that "Internet communications [ . . . including email] are not secure" (see FIG. 01). However, without email, there isn't a credible, vendor-independent electronic means for governments and institutions to reach out and communicate critical information to their customers, leaving snail mail as the only option. Given the explosion of telephone and email fraud of international scale and scope, securing email is not only a technical problem to be solved but a critical social need as well.

The problem with email can be traced to several factors that have been discussed extensively in the literature. Here we focus on a few important factors that are relevant to understanding the current invention.

1. Simple Mail Transfer Protocol (SMTP)—an important part of the email standard that is responsible for transmitting email from senders to email servers—has no concept of authenticating the sender. Any email server can send emails on behalf of any domain or any email address. To address this problem, three separate but related solutions have been proposed in the past two decades: Sender Policy Framework (SPF) uses a DNS record that associates a domain with its mail server's IP address; DomainKeys Identified Mail (DKIM) uses a DNS record that specifies a public key with which the mail server signs the metadata of emails it sends; and Domain-based Message Authentication Reporting & Conformance (DMARC) uses a DNS record to indicate to the receiver how to handle an email that has failed SPF or DKIM check. Shown below are examples of SPF, DKIM, and DMARC records with their cryptic syntax.

--- v=spf1 include: %{ir}.%{v}.%{d}.spf.has.pphosted.com
ip4:148.163.158.5 ip4:148.163.156.1 ip4:67.231.145.127
ip4:67.231.153.87 ip4:168.245.101.145 mx
a:zgateway.zuora.com include:_spf.google.com ~all
v=DKIM1; k=rsa;
p=MIIBIjANBgkqhkiG9w0BAQEFAAOCAQ8AMIIBCgKCAQ
EAmKGhzQEGjOjZyKeZIx1FbC8/8H7Qn+64nyTCiB0xgrfVZKICtYdcXD0oL
O6OgUAYZ7Z6zc4Y5wh5rtcRh7VOKOuwLMXA8fvZSK4za+Mwe0cX0H4TZjM
v=DMARC1; p=none; rua=mailto:dmarc@mishkalo.com;
ruf=mailto:dmarc@miskalo.com; fo=1; adkim=s; aspf=s;
pct=100; rf=afrf

---

While adoption estimates for each of these solutions vary widely, a 2021 study by Tatung et al [1] reports that, of the sampled domains, only 50% used SPF, only 13% used DKIM and only 3% had all three solutions configured correctly.

2. The original email standard does not include any end-to-end encryption for email. The email text and metadata are sent and stored as plaintext. Solutions for email encryption such as OpenPGP and s/Mime have been proposed, but their adoption rates are estimated to be in the low single digits. That said, lack of end-to-end encryption is considered less of a serious problem than authentication for most everyday email, since at least parts of the email paths—client-to-server communication—tend to be encrypted, especially due to the proliferation of webmail clients. Server-to-server communication is still vulnerable to network eavesdroppers.

3. A mindboggling 55-60% of email sent today is estimated to be spam! Of these, about 10% are estimated to escape spam filters and get delivered as legitimate emails. One rather significant reason for the failure of spam filters is that a disproportionately large number of SPF records specify "~" or "soft fail" as the default option for emails that do not pass SPF checks. And a disproportionately large number of DMARC records—if they are present at all—specify "none" as the disposition policy for emails that fail SPF and/or DKIM checks, leaving it up to the discretion of the receiving server what to do with such messages. By avoiding egregious abuse, a spammer operating below the radar can sneak a fake email into the receiver's inbox relatively easily. Although our invention does not directly address spam, it has the potential to curb spam since it can help with the proper configuration of email-related DNS records.

Among other things, this invention is motivated by the following facts and observations:

1. In a large company, the number of organizations and business units sending emails under the company's domain can be quite large. Let's consider a hypothetical, multinational bank where an internal IT team administers the systems and policies for internal email from and between employees. Different units of the bank (banking, credit card, mortgage, etc.) send transactional emails to customers for deposits received, payment reminders, and password resets via API to an email gateway such as Mailgun or Sendgrid. Credit card departments in different countries outsource their solicitation to local marketing agencies which in turn use services such as Mailchimp to send offers to customers and track responses. The company's law firms in different countries send compliance and change-of-terms emails in local languages as per local laws, while another outsourced agency handles the sending of investor relations emails. Employee benefits and HR have been outsourced to an offshore company that in turn has outsourced its email servers for sending recruitment offers and benefit information. Each of these email senders may use one or more cloud-based email servers and CDNs—with potentially floating IP addresses—but all must send email under the company's Internet domain, which means that the company's SPF, DKIM, and DMARC records must be properly configured to send, sign, and monitor this email flow. Furthermore, one department in one country may change its marketing agency which in turn may necessitate the removal of certain IP addresses and the addition of different ones in the company's SPF records. In other words, email policy, in a large modern organization, is a dynamic and complex set of social processes, not a simple sysadmin activity of setting parameters in a DNS record once. This mismatch between reality and email's original intent may explain why the study by Tatung et al. [1] found disproportionately large numbers of domains with missing or misconfigured SPF and DKIM records.

2. For a large company, access to its DNS record must be very tightly controlled because the DNS is the single point of contact—and failure—between the company and its Internet presence. A miscreant can wreak havoc by changing the IP address of the DNS "A" record of say amazon.com, google.com, or irs.gov. As such, most companies restrict the access of their DNS records to the highest levels of their IT departments, expecting that changes to DNS records will be infrequent and handled with extreme care by the most competent IT personnel.

Figure 02:
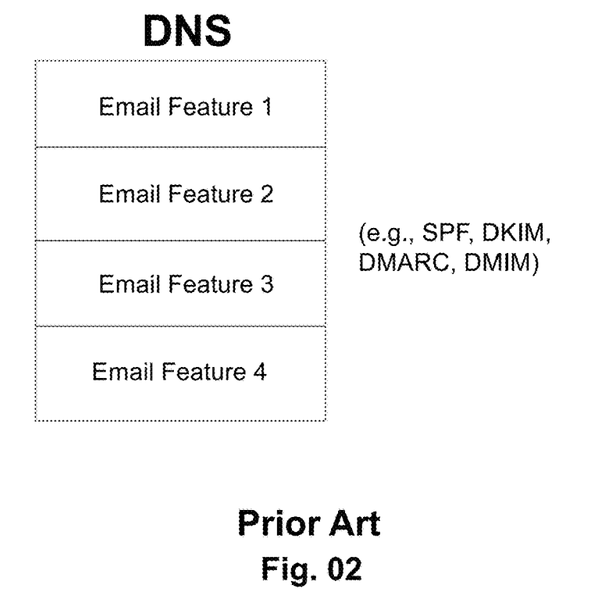

3. Today, email policies are managed right at the DNS as multiple DNS records, i.e., one DNS record for each email feature such as SPF, DKIM, DMARC, BIMI, etc. as shown in FIG. 02. Given that DNS is an archaic table lookup system that is slow and not designed for large volumes of long and complex records, fanout at DNS is undesirable from a performance standpoint. An unfortunate side effect of the slowness of DNS is DNS-caching: avoiding DNS lookup by caching DNS records for minutes if not hours. The current invention enables an alternative strategy: reduce the DNS fanout with a single (long-standing) website link to the DEA and relegate the fanout to the DEA which can be dynamic, serve APIs and UIs, optimized using the most modern cloud technologies, replicated through CDN, etc.

Figure 03:
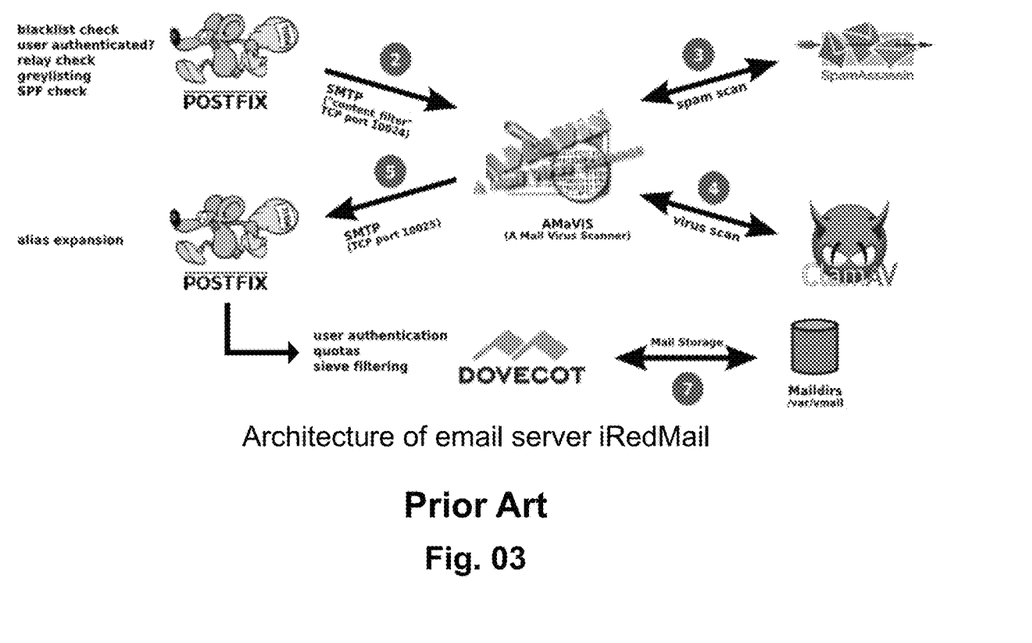

4. The set of email server components and protocols is complex and highly resistant to change as new standards take a long time for end-to-end adoption. FIG. 03 shows a conventional SMTP server with many components with well-defined interfaces which makes email standards and protocols highly resistant to change. It is instructive to note that DKIM and SPF are still in their first versions well after decades of introduction and some of them are still considered "proposed standards."

Figure 04:
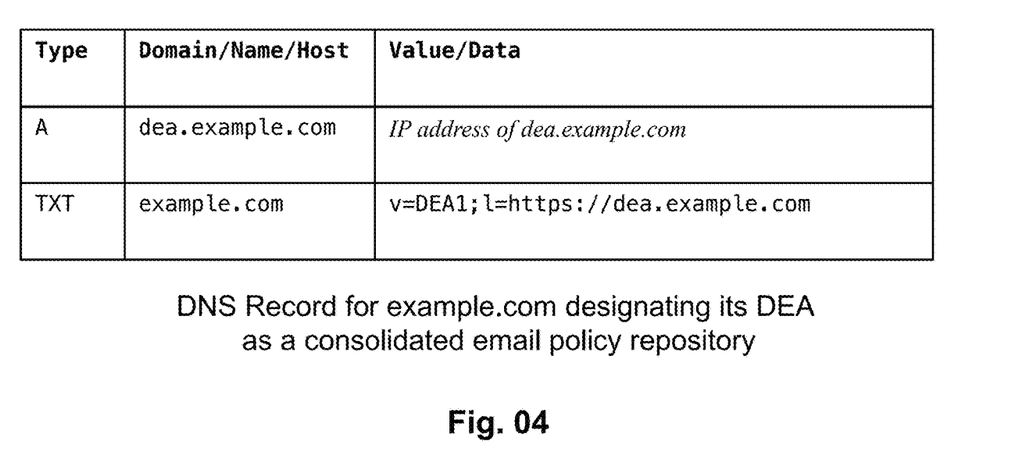
Figure 05:
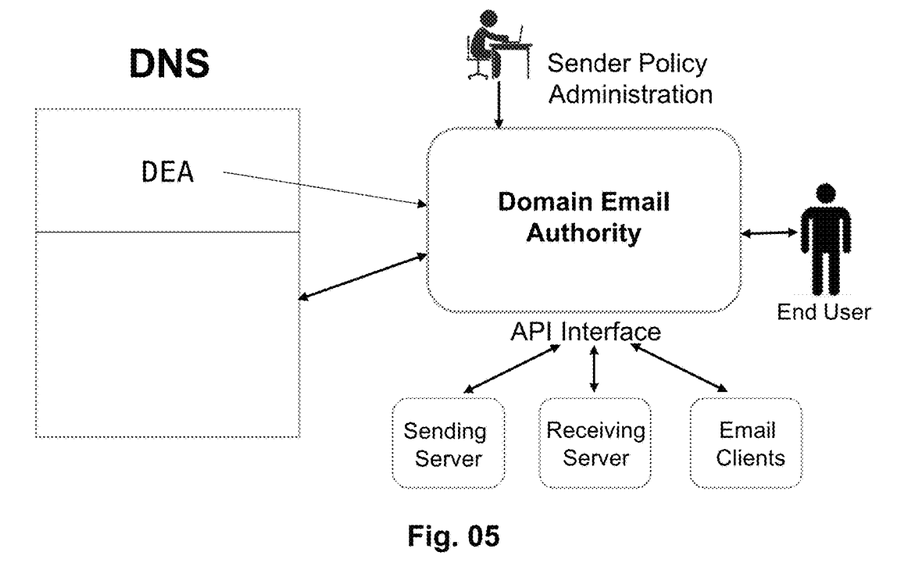

Our invention solves several email-related problems with a Domain Email Authority (DEA): a consolidated entity that collects, validates, stores, and serves all email-related policies of an Internet domain directly to DNS, email servers, email clients as well as end users (FIG. 05). A single DNS entry associates the domain with its DEA by specifying the name and/or address of the DEA and this association can be long-lasting (FIG. 04). Once the DEA is associated with the domain, it can support UI and API access through which it can be accessed by policy administrators, email servers, email clients as well as end-users. Furthermore, even individual components such as the Mail Transfer Agent (e.g., Postfix) or Mail User Agent (e.g., Dovecot) of email servers (see FIG. 03) can query the DEA if necessary to implement point changes without the need for end-to-end adoption.

Some aspects of this invention can be adopted without the need for any change to existing email standards. Others can be adopted gradually over a period of time through changes to individual protocols and individual components of the email ecosystem. In other words, the ideas described in this document can be adopted gradually with one change at a time without requiring end-to-end adoption by the entire email ecosystem all at once. Furthermore, the DEA brings the end-user into the picture, enabling the end-user to exercise some control over the integrity of their email, and the standard agencies to take input from end-users either directly or via experimentation, rather than acting as "expert panels."

BRIEF DESCRIPTION

The email policies of a domain are described in a Domain Email Authority (DEA) which is linked to the DNS record of the domain through which the DEA derives its authority. In one embodiment, the DEA is implemented as a website. The website may preferably have a URL that is a standard subdomain of the domain so that users can be educated to look for this standard subdomain as the ultimate authority regarding email from that domain. So, for example, to find out anything about an email from abc@xyz.tld, a user would go to https://dea.xyz.tld.

A schematic of the DEA is shown in FIG. 05. The DEA enables email policy administrators to input various email policies into the DEA in an access-controlled and distributed fashion. In other words, the DEA acts as a workflow system that enables a distributed team of people—inside and outside a company—to define its email policies. The DEA can provide friendly UIs for non-technical personnel to define the policies, cross-check and validate the policies to ensure their consistency and translate them into appropriate DNS parameters that implement the policy. In some embodiments, the DEA directly updates the DNS records of the domain based on the current policies. In other embodiments, where human approval is needed, the updated DNS records are presented to a system administrator who is empowered to update the DNS entries. Simply being able to gather SPF and DKIM info from multiple policy administrators across a large company, validate and update the corresponding DNS records can eliminate the multiplicity of errors reported in the study by Tatang et al [1].

In many embodiments, the DEA also provides a UI for the (receiving) end-user so that a sending domain can warn the end-users about potential fake emails and fake addresses, and for the end-users to report the same to the domain. Such functionalities can be implemented without requiring any change to email servers and clients.

More advanced embodiments of DEA may support additional policies that may be communicated directly (via API) to email servers and/or clients as well as to end-users. For example, email servers can register the (unique) Message-ID of emails sent by the server with the DEA and end-users can query the DEA with a Message-ID to determine if a received message is authentic. We describe several such use cases in the embodiments.

To summarize, the DEA enables a domain to enhance email security at least in the following ways:
- By treating email policy management as an organizational process that involves multiple players inside and outside an organization, the DEA can effectively gather, validate, and communicate a consistent and up-to-date set of email policies to the DNS as well as other constituents.
- By providing an interface to end-users, it can bring the end-user as an interested and invested party in enhancing email security.
- By recognizing that the email ecology is highly resistant to change, DEA provides an experimental vehicle through which change can be gradually introduced to any level of the email ecology. For example, the user being able to validate the authenticity of an email through its Message-ID can be accomplished with a change to just the Mail Transfer Agent of the email server and without involving clients; or spam filters can directly query the DEA for user-reported spam addresses.

Email security is a critical social need. The very means that have made email indispensable—standards and interoperability, cautious adoption of new features, and resistance to change—are also the reasons why it is difficult to effect change in the email ecosystem. This invention describes a new approach that enables us to fix some of today's problems without the need for any change to existing standards. Yet it offers a flexible mechanism for experimentation and gradual introduction of new features while bringing the end-user into the email loop.

LIST OF FIGURES

FIG. 01 is a facsimile of a part of USPTO form SB/439 (prior art).

FIG. 02 is a schematic showing email-related DNS entries today (prior art).

FIG. 03 is a schematic of an open-source email server iRedMail (prior art).

FIG. 04 depicts a setup for a DNS entry for a Domain Email Authority (DEA).

FIG. 05 is a schematic of a Domain Email Authority (DEA).

FIG. 06 is a schematic showing the internal structure of a DEA.

FIG. 07 is an illustrative example of some roles and privileges in a DEA.

FIG. 08 is a screenshot from DEA for an email policy administrator of Example Bank.

FIG. 09 is a screenshot from DEA catering to an email-receiving end user.

DETAILED DESCRIPTION

A Domain Email Authority (DEA) is a consolidated technological entity that gathers, validates, and stores all email-related policies of an Internet domain, and serves these policies to multiple constituents including the DNS, email servers, email clients, and end-users. A DEA can be implemented in many ways: as a website, as a repository that has hardwired connections to servers providing APIs to clients and a Google Sheets interface to users, and so forth. To make the discussion easier and without preference or prejudice, we'll assume that a DEA is implemented as a website (without implying that DEAs are always implemented as websites), specifically as a website that is organized as a subdomain of the domain for which it fulfills the role of a DEA. In the discussion below, we'll assume that our domain is named example.com and its DEA is named dea.example.com. We will also assume that the domain example.com is a domain of a multinational bank called Example Bank. The domain has a DNS entry of type TXT and its value points to the DEA's website (see FIG. 04):

TXT v=DEA1; l=https://dea.example.com

Although the website can be named anything, making it a standard name and further a subdomain of the domain has two advantages: users can be educated to always look for and trust only the "dea" prefix as the DEA of a domain (as opposed to checking the DEA's URL in the DNS). Second, subdomain names are still under the control of the domain, so a subdomain is less likely to be an imposter for a DEA than an arbitrary URL.

Figure 06:
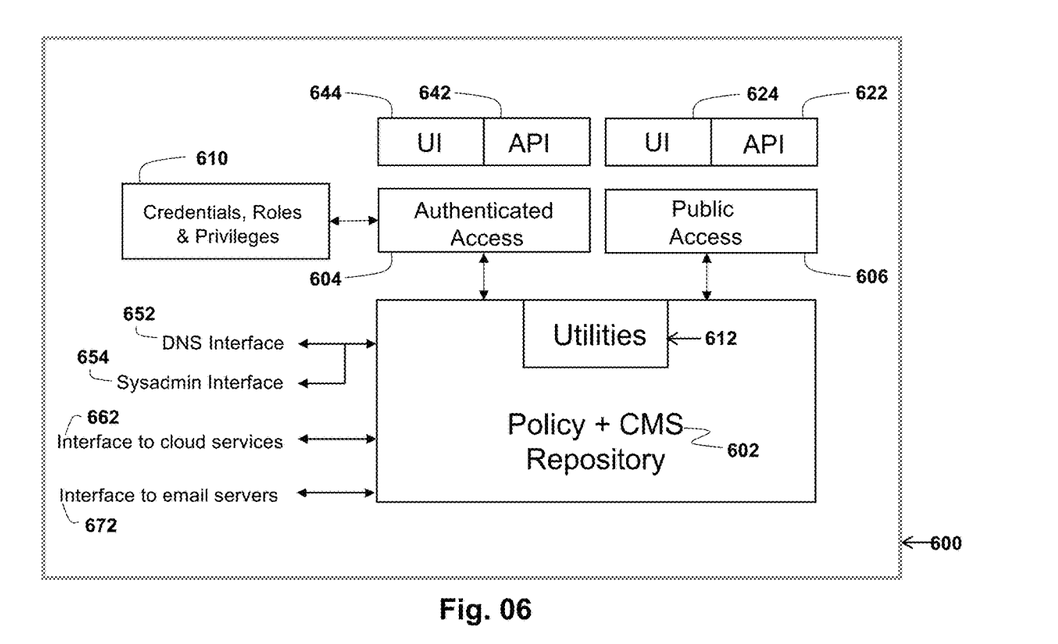

FIG. 06 depicts a schematic of a DEA from an illustrative embodiment of the invention. Its components are described below:
- 600 refers to the DEA and all its components.
- 602 is a repository that stores the email policies of the domain collected from the email policy administrators; it can also store CMS data such as DMARC reports and other information that may be displayed through UIs 624 and 644.
- 612 represents a set of utilities that operate on the repository. A non-exhaustive list of such utilities includes syntax checkers, consistency checkers, validators for DNS records, DMARC analyzers, the transformation of policy inputs from human administrators to appropriate SPF/DKIM/DMAC syntax, etc. For example, a validator might send an experimental email to the DEA so that the validator can check if the received email passes SPF and DKIM checks. Another validator may periodically ping the email servers' IP addresses to ensure that the servers are up and responding. Another validator may (via the email server interface 672 and/or its underlying cloud server interface 662) check if all the servers listed in the SPF records have valid DKIM selectors. We expect that, as the email needs of a domain grow, the set of utilities will grow in the interest of automating as many tasks of the DEA as possible. The utilities may also be specific to the domain: for example, a local law may prevent a company (and therefore its domain) to send customer emails from a foreign IP address.

652 is a direct interface to the DNS so that the DEA can check if the email-related DNS records are current; if not, they may be updated in accordance with the policies specified in the policy database.

654 is an interface to system administrators to inform them of DNS updates and/or to request them to make the DNS updates in case direct access by DEA to DNS is unavailable or considered undesirable by the domain administrators.

662 represents interfaces to cloud providers on which email servers are sourced. In some embodiments, the DEA may be empowered to source new email servers directly from cloud services; in others, the DEA may simply use this interface for diagnostics and/or performance monitoring of the email servers.

672 represents interfaces to various email servers belonging to the domain. These interfaces may be used for ensuring that the email servers have the correct DKIM selector keys (as specified in DKIM records) and for various maintenance functions such as downloading/purging log files.

606 represents public or non-privileged access to the DEA. For example, some embodiments may directly serve email policy information to email servers and clients (without intermediation through the DNS). Further, the non-privileged interface may be used to inform end-users of outage times, spam addresses, etc. (more on this later). The non-privileged access may be provided via both UI (624) and API (622).

604 represents authenticated access to the DEA. Typically, 604 works in consort with 610 which stores the credentials, roles, and privileges for authenticated access. Authenticated access may also be provided via both UI (644) and API (642). Policy administrators, who have specific roles and privileges will access the repository (via authenticated access) to define, modify and/or delete email policies as allowed by their roles and privileges. Roles and privileges are explained below.

Figure 07:
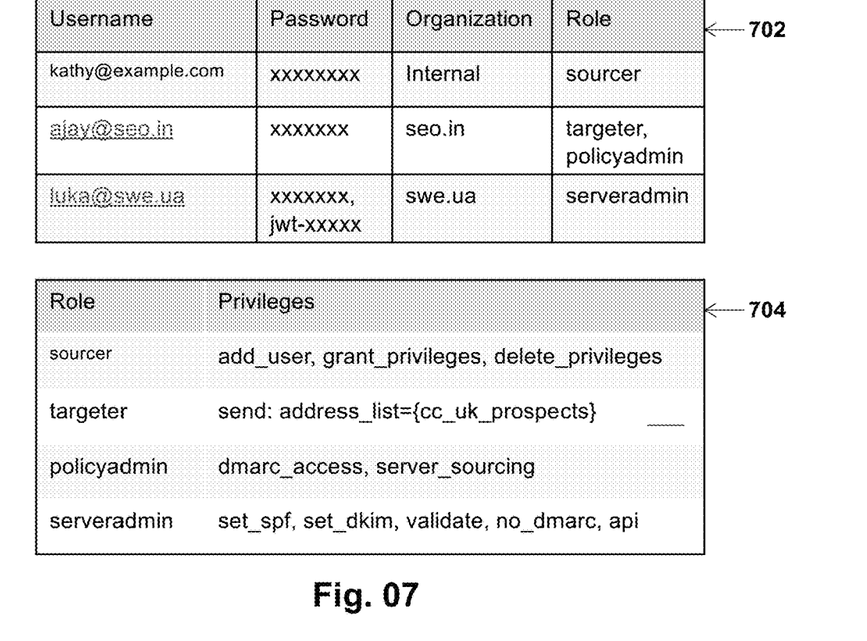
Figure 09:
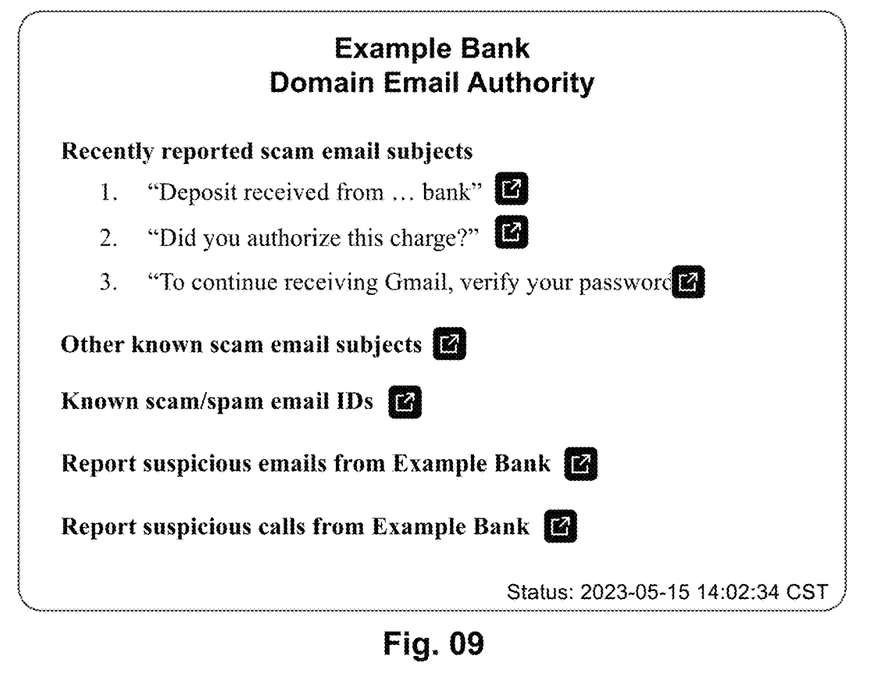

Tables 702 and 704 in FIG. 09 list examples of some roles and privileges. These examples are, by no means, meant to be exhaustive, as the list of roles and privileges may depend on and evolve with the needs of the domain. Table 702 lists three users with their credentials and roles. The first user, kathy@example.com is an internal employee who has the role of sourcer, i.e., empowered to source email services from external providers. Table 704 shows that a sourcer's privileges include adding new users and granting and deleting privileges. The second user belongs to a different organization and has the roles of targeter and policyadmin. From 704, we see that a targeter can send messages to particular addresses (e.g., a list of UK credit card prospects' addresses). A policyadmin can access DMARC reports, and source/procure servers (presumably from a cloud provider for sending mail). Finally, the third user, who is from yet another organization, has both a password for UI access and a jwt-based API token for API access to DEA and is provided serveradmin privileges, which (as per 704) means that this user can set and validate SPF and DKIM parameters, has API privileges and no access to DMARC reports.

Embodiment A: Collecting Email Policies

Figure 08:
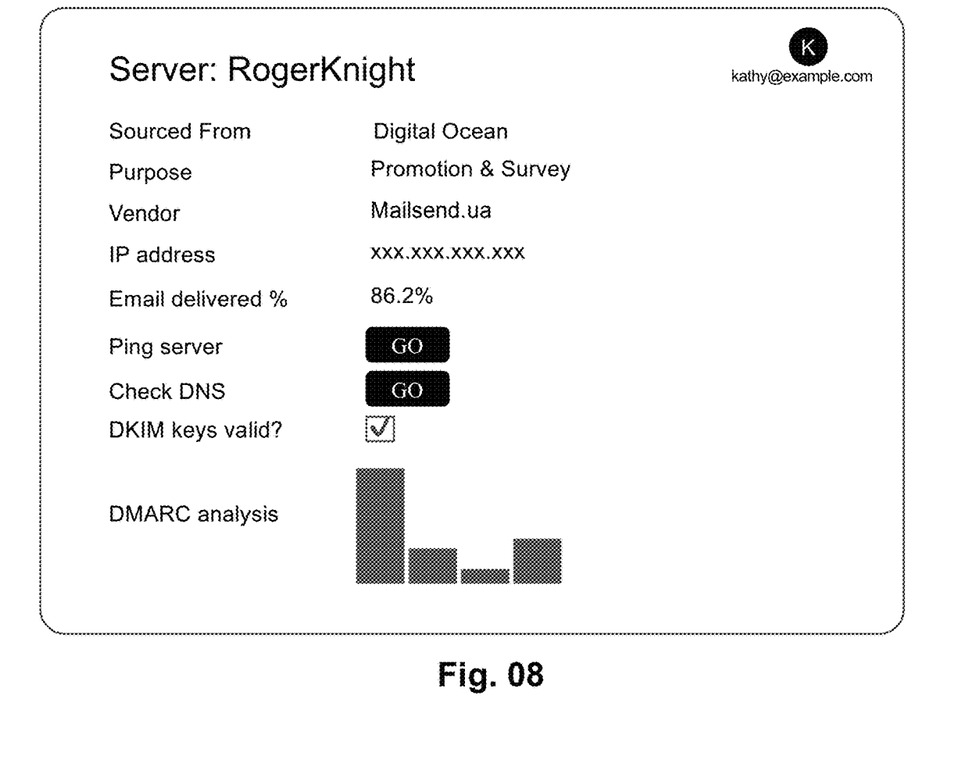

Embodiment A collects, validates, and stores a domain's email policies in the DEA and serves them to the DNS as in 652 and/or to the system administrators as in 654 (in case manual update of DNS records is considered desirable). As such, Embodiment A contains a workflow system for collecting policies from email policy administrators with specified roles and privileges in Table 610. FIG. 08 shows an example screen from a policy administrator's UI to illustrate the level of help and automation provided by a DEA to an email policy administrator. The screen shown enables a policy administrator to check the status of a mail server, check that it is configured correctly, see a DMARC analysis of the delivery status of emails sent from the server, and so forth.

It may be noted that Embodiment A does not require any changes to email standards and/or to email servers and clients.

Embodiment B: User Integration

Today's email standards were designed by "expert committees" with little or no input from—or visibility to—users. A telltale example of this philosophy is reflected in spam filtering. Each server (and server vendor) uses its own "magic" for deciding what is spam, what ends up in a user's Inbox, and what ends up in junk mail. A user, receiving a tax due notice purportedly from the tax agency has no way to tell why the email ended up in their Inbox and whether it is legitimate or why an email from a friend ended up as junk mail.

One of the unique features of the DEA is its direct interface with end-users. An end-user can consult with a domain's email authority to obtain the status of emails being sent by that domain, and for email policy administrators and end-users to receive direct input from each other. FIG. 09 shows an end-user screen from dea.example.com. This screen warns users of recently reported email scams to watch for as well as other known scam emails. It also provides the users with a list of scam/spam email IDs purporting to be from Example Bank. Further, it enables a user to report a suspicious email or call received from someone claiming to be from the bank. Assuming that users are educated that every domain has a DEA that is as trustworthy as the domain's website, the DEA can now act as a bidirectional channel between the end-user and the domain (i.e., the organization behind the domain) concerning email security. Not only can the organization provide a one-stop shop for users to assure themselves that a received email is a scam, but it also enables the users to proactively warn the domain's email policy administrators of suspicious email content and email IDs.

Since spammers often send strings of emails to users in different domains, as end-users report the spammers through DEAs, domains can share spammer email IDs as well as the content of spam/scam emails. In other words, DEAs enable domains to coopt the end-users and share the inputs received from their respective end-users.

It may be noted that Embodiment B does not require any changes to email standards and/or to email servers and clients.

Embodiment C: Authentication through Email Headers

Figure 10:
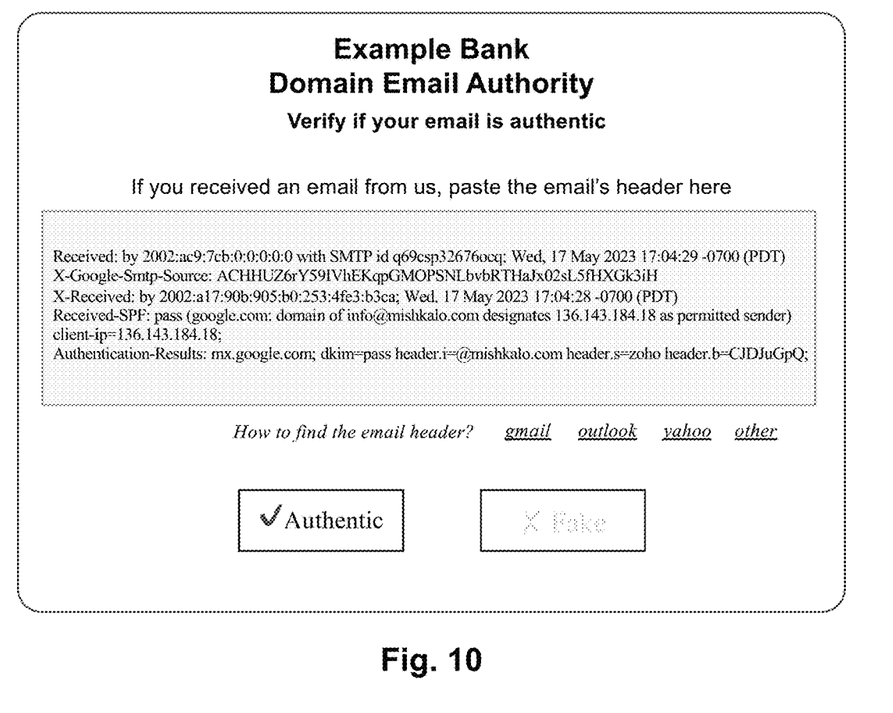
FIG. 10 is a screenshot from DEA for an end user to authenticate an email header.

Embodiment C enables a user who receives an email from a given domain to directly contact the DEA of the domain to verify if the email is authentic (see FIG. 10). Here, the user is guided to find the email header in the email and paste it into the DEA's UI. The DEA can verify that the IP address from which the receiver received the email is indeed one that is the domain's email server and can verify the addresses and paths through which the email was routed. Of course, the header will also show if the receiving server was properly able to validate the email as well.

It may be noted that Embodiment C does not require any changes to email standards and/or to email servers and clients.

Embodiment D: Authentication through Message-ID

Embodiment D enables a user who receives an email from a given domain to directly contact the DEA of the domain to verify if the received email is authentic using the Message-ID of the received email. Please note that every email message has a unique Message-ID that is a large random number and unlikely to be guessable, such as 3CC81EFE-9A87-43B0-A200-DE0689BC6CD2@example.com. This embodiment illustrates that, even in the absence of SPF and DKIM records, it is still possible to verify the authenticity of an email message directly from the email's sender. Secondly, this embodiment also illustrates a simple case of how the DEA enables email to introduce new features without requiring end-to-end adoption of the feature by the entire email ecosystem.

Figure 11:
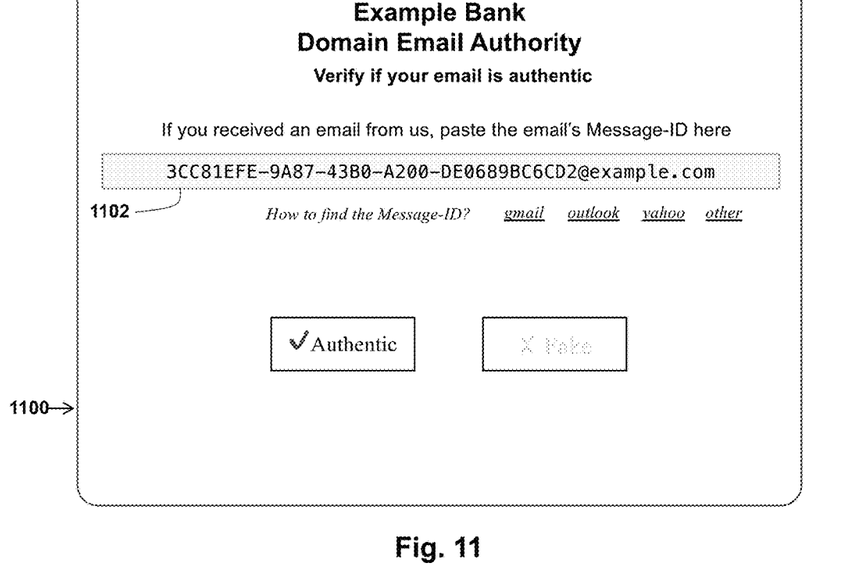
FIG. 11 is a screenshot from DEA for an end user to authenticate a Message-ID.
Figure 12A:
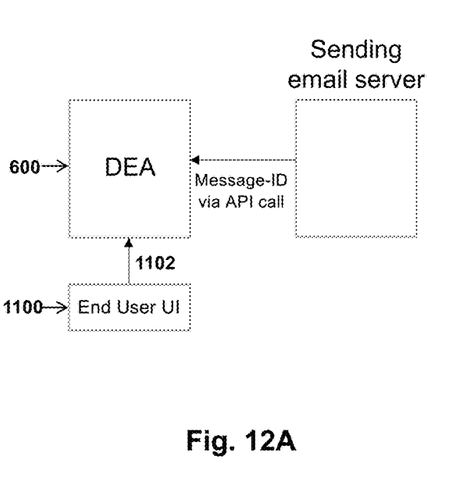
FIG. 12A depicts how one version of Embodiment D may gain access to Message-ID.

In one version of Embodiment D, the sending servers forward to the DEA the Message-ID of every email message they send. FIG. 11 shows screen 1100 where the email receiver can enter a Message-ID 1102 into the screen and have the DEA verify if this is a legitimate and recognized Message-ID. FIG. 12A shows how this is accomplished. The sending email server sends the Message-ID to DEA 600 via DEA's API interface whenever the server sends out an email, which 600 stores in its repository. When a user checks for the authenticity of a Message-ID via 1100, 1100 passes the Message-ID to 600 which checks if the given ID is present in the repository.

Figure 12B:
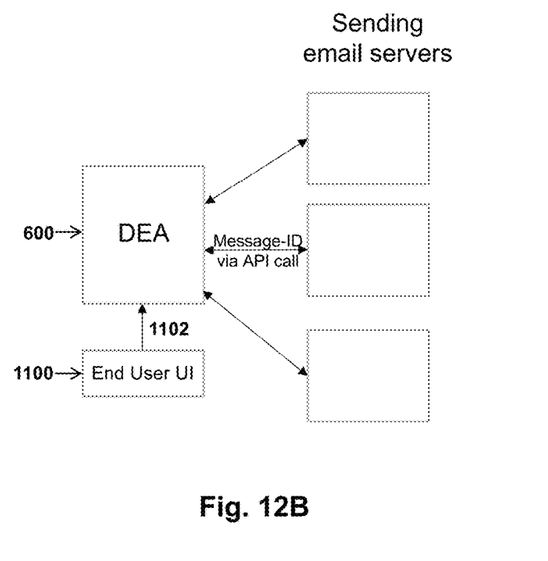
FIG. 12B depicts how another version of Embodiment D may gain access to Message-ID.

In another version of Embodiment D rather than receiving all Message-IDs beforehand, when a DEA 600 is presented a Message-ID 1102 by the user through screen 1100, the DEA makes API calls to its various email servers to verify if an email with that Message-ID was ever sent. This is shown in FIG. 12B.

While Embodiment D does not require any change in email protocols, it does require a point change in the Mail Transfer Agent (MTA) of a conventional SMTP server but does not require any change to any other components.

Another way to understand the point made above is that, with current email standards, an email carries all information about itself—its sender, intended receiver, content, and every other piece of information about that email. Because of this, any change to any field in an email can have a cascading effect on various email components from the mailer to the email client and everything in between. In contrast, the DEA provides touchpoints for different email components to verify or augment information about an email. In Embodiments A and B, we showed how the DEA, by having a direct interface with the policy administrators and the end-user can enrich the email ecosystem. Embodiment D is an example of how the DEA can act as another source of truth about an email. As a result, new features and changes to existing email architecture need not all be present in the email itself (requiring end-to-end adoption). Instead, some of the features and changes can be captured in the DEA and provided to specific email components that need them. Specifically, FIG. 12-A illustrates the case where Message-ID, being available to the DEA, can be leveraged by the client directly without having to depend on the existing email ecology.

Figure 13:
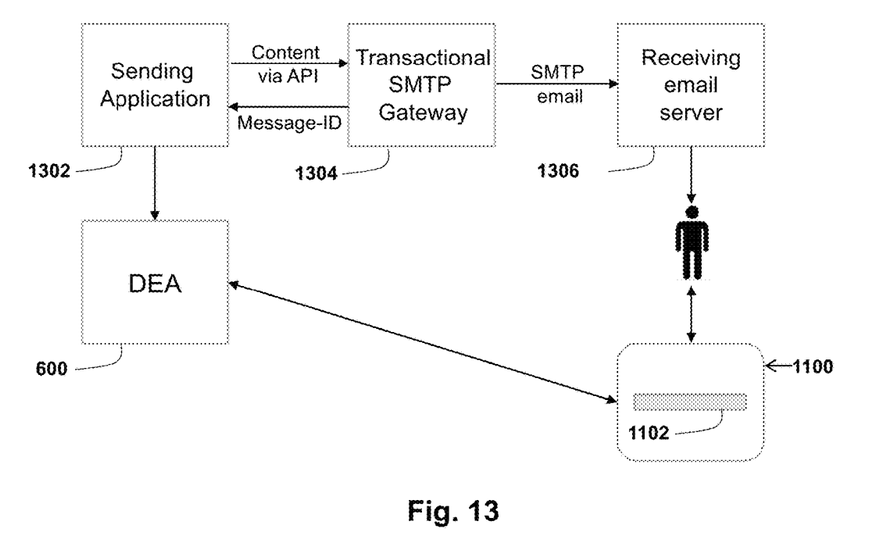
FIG. 13 depicts how a transactional SMTP server may provide Message-ID to a DEA.

We also note that, with most transactional email, companies today use transactional SMTP servers such as Mailgun, Sendgrid, etc. which receive an email's content from the sender via a REST API call (rather than SMTP), send the message to the receiving server, returns a Message-ID to the sender, and sends the email message as an SMTP message to the receiving server. In such cases, authentication based on Message-ID will require no change to any email standards or email server components. This is shown in FIG. 13, where a sending application 1302 (e.g., a banking application sending deposit confirmation emails) sends an email to a customer through an API-based transactional SMTP gateway 1304 (e.g., Mailgun) and receives a Message-ID back which it stores in the DEA of the domain 600. The SMTP gateway sends the email as a regular SMTP email to the customer's email server 1306, from which the customer receives the email. The customer can directly contact the DEA 600 via the screen 1100, input the Message-ID, and have it verified directly by the DEA 600.

Embodiment E: Username Policies with Reified Names

An unfortunate part of the email standard is the notion of a "display name" for users that is separate from the email ID. While an email ID is a reified object guaranteed to be unique and treated as an object within the email address space, the display name is neither a reified object nor integrally connected to the email ID. Once a user registers an email ID with a domain, the user can choose any display name to go with the email ID and change the display name as often as one wants. For example, there can be only one email ID called bob@example.com. However, Bob can use the display name "Micky Mouse" to send an email to Alice, use the display name "Citibank Fraud" to send an email to Peter, and use "Barak Obama" to send an email to a third person. In other words, the display name has no real physical or temporal connection to the email ID, which is a reified, addressable object in a global email address space.

Figure 14:
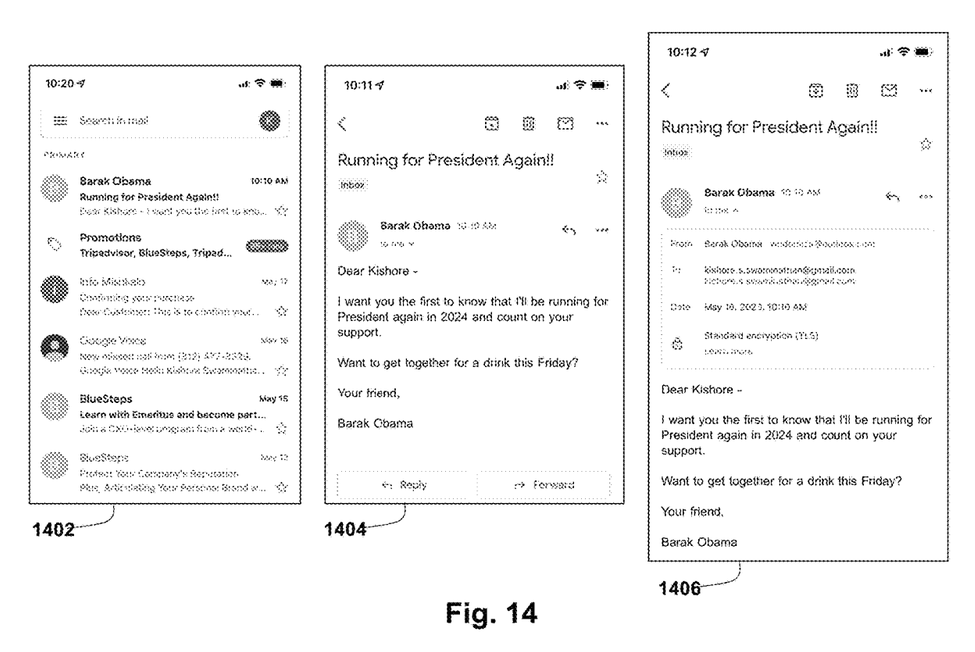
FIG. 14 depicts facsimiles of screenshots from a commercial email client.

To make matters worse, most email clients show only the display name of the sender (as opposed to the sender's email ID) as the default. In most cases, the users have to expand the display name to see the real email ID. FIG. 14 shows three screens from Google's Gmail mobile app: 1402 shows the email listing, 1404 shows an email detail screen and 1406 shows the email ID only when the user knows how to expand the email header. Fraud based on faking a display name is trivial to commit and a mainstay of many scamsters who send emails from random email addresses but pretend to be tax authorities, police, social security, bereaved family member, and so forth. We note that our aim here is not to single out Google or Gmail. The mobile and web clients of Microsoft Outlook, Apple Mail, and Yahoo Mail all do the same because this is deemed the standard.

Embodiment E provides a solution through which the DEA can support the email client in customizing the displayed username. Shown below are three API calls made by an email client to the DEA, asking for the display name for an incoming email ID.

```
https://dea.example.com/display-name/bob@example.com => none
https://dea.example.com/display-name/customer-srv@example.com =>
{"display": "Example Bank Customer Service"}
https://dea.example.com/display-name/karen@example.com =>
{"display": "Example Bank Supervisor"}
```

In the first case, the DEA requests the suppression of any display name for bob@example.com in the second, the DEA provides a designated and reified name representing the company and in the third case, the DEA provides a role-based display name for an individual because that display name is more relevant and meaningful from the point of the receiving customer. We assume that the reified names are provided and/or approved by the email policy administrators.

The point being made by Embodiment E is twofold: email security is not just technical details such as authentication and encryption, but also the interface through which the information is presented to the user and the confidence the user attaches to the presented information. If lack of authentication is a gaping security hole in email standards, so is display names-a ridiculously easy way to send email under a fake name that is not just ignored by today's email clients, but actively supported to make the display "look nice." Embodiment E not only provides a solution to prevent this fraud but also shows how the DEA enables a wide range of features for experimentation with which email security can be improved.

It may be noted that Embodiment E does not require any changes to email servers, only to the display component of email clients that communicate directly with the DEA.

Embodiment G: Enabling Encrypted email

Email encryption has been a holy grail of email security. The two known standards for email encryption—PGP and s/MIME—have seen little traction over the years as these involve both senders and receivers having to install digital certificates signed by a certificate authority and a full public key infrastructure. Except for minimal use within the firewalls of enterprises. email encryption has been a non-starter.

Here we describe a much simpler approach to email encryption that is not quite end-to-end but encrypted across servers (note: most server-to-client communication, especially with webmail, is currently encrypted anyway). To achieve this, the DEAs act, collectively, as a public key infrastructure, wherein each domain publishes its public key which can be queried by anyone via an API call. Suppose example.com wants to send an email to alice@outlook.com, example.com can get the public key of outlook.com with the following API call:

```
https://dea.outlook.com/public-key => Outlook's public key
```

Figure 15:
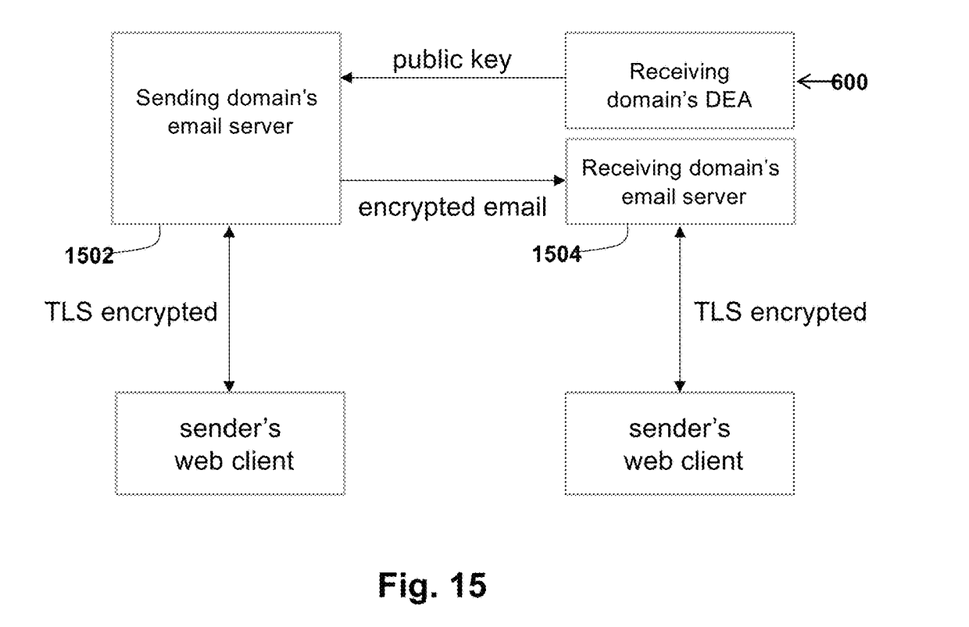
FIG. 15 depicts the data flow pertaining to Embodiment G.

The mail servers of example.com can now encrypt the outgoing mail to alice@outlook.com with outlook.com's public key so that it can only be decrypted by Outlook's servers. FIG. 15 is a pictorial depiction of the workflow in Embodiment G, where the sending domain's email server 1502 requests the public key of the receiving domain from its DEA 600. Then 1502 encrypts the email to be sent using the receiving domain's public key and sends it to the receiver's email server 1504 which can decrypt the email with its private key. Please note that, while this is not end-to-end encryption, all network hops are encrypted thereby preventing network-level eavesdropping.

Embodiment H: Enabling Receiver-Specific Email Encryption

Embodiment G can be extended further for specific receivers with a higher need for security. Consider, for example, an email ID such as transfer-money@ example-.com that is to receive money transfer requests for Example Bank and perform the money transfers automatically. The DEA of example.com can, in addition to an overall public key for the domain, specify public keys for specific email accounts as follows:

```
https://dea.outlook.com/public-key/transfer-money@example.com =>
Public key for transfer-money@example.com
```

The sender can now encrypt a message directly for the specified receiver who, presumably, holds the private key to decrypt the message. Although not practical for human users, such an encryption scheme can be eminently deployed for automated email IDs that are required to be particularly sensitive and private and where the server needs plausible deniability since only the email ID (and not the email server) can decrypt this email.

Embodiment I: Integration of Both Sending and Receiving Users

In previous embodiments, we showed how an email receiver can directly interact with the DEA of the sender. In Embodiment I, we'll adapt Embodiment H to illustrate a case where an end-user can directly interact with their own DEA.

Figure 16:
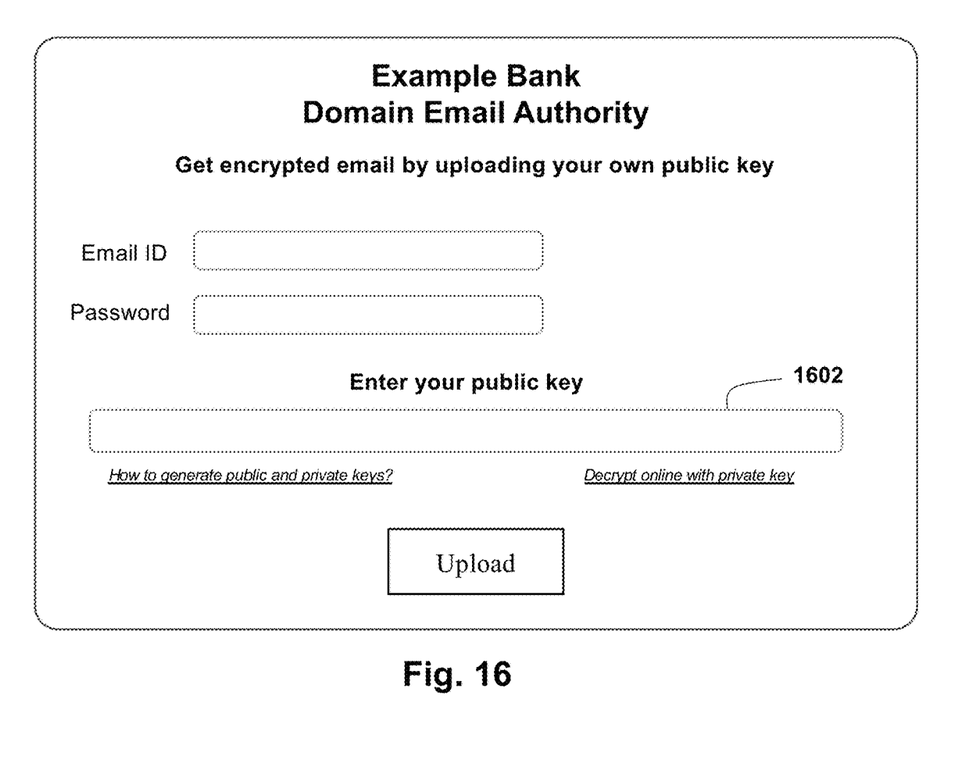
FIG. 16 is a screenshot from DEA for a user to upload their public key.

FIG. 16 shows a UI that enables a user of example.com to register a public key so that senders can send encrypted emails to that user. Imagine a user, alice@example.com accessing dea.example.com, logging in with her email ID and password, and uploading a public key 1602. As described under Embodiment H, senders to alice@ exampe.com can request her public key from dea.example.com and encrypt their email with that public key, ensuring that only Alice can decrypt the email with her private key.

Please note that, in this case, dea.example.com simply functions as a custodian of Alice's public key and neither the dea.example.com nor the email servers of example.com have any way of decrypting the email encrypted with 1602. Alice is left to her own devices to decrypt her email, though the DEA can provide various encryption/decryption resources.

While the above is probably beyond the reach of most human users, it is eminently useful for automated email accounts. For example, an account such as transfer-money@example.com can use an API call to its DEA to upload a public key as follows:

```
https://dea.example.com/upload-public-key => {Status: ok}.
```

Embodiment H: DNS Optimization

The Domain Name Service or DNS is critical to the integrity and performance of the Internet but is an archaic table-lookup technology that can significantly affect the performance of address lookups. Of all DNS entries of a domain, email-related TXT entries tend to be the longest and most numerous. What the DEA does is consolidate the email-related entries away from the DNS and replace them with a single, long-standing link to the DEA. While these TXT records need to be present in the DNS for the near future, over a period of time, they—and any other new email-related DNS policy records—can be eliminated from the DNS and served directly from the DEA via API calls. In other words, the DEA is an example of reducing clutter and fanout at the DNS through a much more flexible mechanism such as a website.

Although unrelated to email per se, another class of DNS records that tend to be numerous are site-verification records: i.e., records added by a domain owner to prove domain ownership to third parties. Here is an example of a site verification record.

```
["host" => "example.com",
  "class" => "IN",
  "ttl" => 219,
  "type" => "TXT",
  "txt" => "atlassian-domain-
  verification=sQQk6YxOzvD/debvDHjnRazCDNLZ3S0a0a50paa8T6CyuAb7ItKJmb47XKHv4f",
  "entries" => [
    "atlassian-domain-
    verification=sQQk6YxOzvD/debvDHjnRazCDNLZ3S0a0a50paa8T6CyuAb7ItKJmb47XKHv4f",
    "ttl" => 219,
    "type" => "TXT",
    "txt" =>
"Hp48LTxGknu4omlcp1bP0HqFH2VBFOLA88QS7zwDTJQaM2moc6schoR8P30qVYcuO/RK+cUiCTnntk5pSUk+SA==",
    "entries" => [
"Hp48LTxGknu4omlcp1bP0HqFH2VBFOLA88QS7zwDTJQaM2moc6schoR8P30qVYcuO/RK+cUiCTnntk5pSUk+SA=="]
```

Even though domain verification is for one-time use only, most domains leave them on with the result that, as per the author's experiments, an average Fortune 500 domain has 18 site-verification records making them by far the least useful and most inefficient of the DNS entries.

Another potential use for the DEA, besides being a Domain's Email Authority, is to host site-verification records, thereby dramatically cutting down on the amount of junk in the DNS and reducing DNS lookup times significantly.

So, for example, a site can request site verification records as follows:

```
https://dea.example.com/site-verification/* => all site
verification records
```

Further, site verification records are meant for a given third party to verify if a putative owner of a domain can insert a DNS record for the domain. It is a purely private transaction between the third party and the domain and there is no reason for this to be broadcast to the public via the DNS. For instance, a domain may not want to reveal to its competitors which third parties it works with. Or a domain may not want to reveal to a given third party that it also works with another third party, but the current practice of site verification through public DNS records has no way of hiding what is essentially a private transaction. Embodiment I can also support private site verification by requiring the third-party verifier to specify a private key that has been provided by the domain.

```
https://dea.example.com/site-
verification/?verifier=facebook/?private-key-private_key =>
Facebook's site verification record
```

This ensures that a private transaction between two parties not only remains private but also does not clutter and degrade the performance of the DNS.

REFERENCES

[1] Dennis Tatang, Florian Zettl, and Thorsten Holz. 2021. The Evolution of DNS-based Email Authentication: Measuring Adoption and Finding Flaws. In 24*th* *International Symposium on Research in Attacks, Intrusions and Defenses (RAID '21)*, Oct. 6-8, 2021. San Sebastian, Spain. ACM, New York, NY. USA 16 Pages. https://doi.org/10.1145/3471621.3471842

The invention claimed is:

1. A system for collecting and distributing email policies associated with an Internet domain, the system comprising:
    Internet-connected servers comprising one or more processors coupled to non-transitory computer-readable storage media storing program instructions that, when executed by one or more processors, cause the Internet-connected servers to implement a Domain Email Authority (DEA) for the Internet domain; wherein the DEA is designated by the Internet domain, via a Domain Name System (DNS) record stored in at least one authoritative DNS server of the Internet, as a domain-level email policy manager for the Internet domain,
    the DNS record comprising:
        a designated domain field containing the Internet domain;
        a designated type field containing a predetermined type indicator; and
        a designated value field containing a web address for accessing the DEA;
    and wherein the DEA comprises:
        a policy collection interface for collecting email policies of the Internet domain from policy administrators and other designated parties authorized to administer email policies for the Internet domain;
        a policy repository for storing email policies; and
        a policy distribution interface for distributing email policies to email servers configured to enforce policies on emails from sender addresses whose domain portion matches the Internet domain, the domain portion being that part of an email address following the "@" symbol;

wherein the policy collection interface is configured to:
  provide authenticated access to the policy administrators and the other designated parties authorized to administer email policies for the Internet domain to: create, modify, or delete email policies associated with the Internet domain;
  validate email policies for accuracy and consistency as determined by one or more validators provided by the DEA; and
  store the validated email policies in the policy repository; and
wherein the policy distribution interface is further configured to:
  distribute, via a non-privileged interface, one or more validated email policies stored in the policy repository to requesting parties seeking email policies associated with the Internet domain.

2. The system of claim 1, wherein the policy collection interface provides an interactive graphical user interface for the policy administrators and the other designated parties to create, modify, or delete email policies associated with the Internet domain.

3. The system of claim 1, wherein the DEA connects to an authoritative domain name server of the Internet via APIs to create, modify, or delete at least one DNS record whose domain field specifies the Internet domain.

4. The system of claim 1, wherein the DEA displays instructions to an administrator of the Internet domain to create, modify, or delete at least one DNS record in an authoritative domain name server of the Internet.

5. The system of claim 1, wherein an email policy distributed by the DEA specifies one or more IP addresses authorized to send outgoing emails on behalf of the Internet domain.

6. The system of claim 1, wherein an email policy distributed by the DEA comprises a cryptographic key for authenticating Domain Key Indexed Mail (DKIM) sent by an email server that sends emails on behalf of the Internet domain.

7. The system of claim 1, wherein the policy distribution interface is further configured to distribute at least one email policy directly to an email client, the at least one email policy comprising a public key associated with an email address whose domain portion matches the Internet domain.

8. The system of claim 5, wherein each of the one or more IP addresses is provided by one or more policy administrators.

9. The system of claim 1, wherein the DEA further provides a user interface through which a user can verifies authenticity of an email that claims to originate from an email address under the Internet domain.

10. The system of claim 1, wherein the DEA further provides one or more APIs for email clients to query the DEA for display names of email addresses under the Internet domain.

11. A method for collecting and distributing email policies associated with an Internet domain performed by a computer-implemented Domain Email Authority (DEA), wherein the DEA is designated by the Internet domain, via a Domain Name System (DNS) record stored in at least one authoritative DNS server of the Internet, as a domain-level policy manager for the Internet domain, the DNS record comprising:
  a designated domain field containing the Internet domain;
  a designated type field containing a predetermined type indicator; and
  a designated value field containing a web address for accessing the DEA;
  and the method performed by the DEA comprising:
  collecting email policies of the Internet domain from policy administrators and other designated parties authorized to administer email policies for the Internet domain, wherein collecting email policies of the Internet domain from policy administrators and other designated parties comprises:
    providing authenticated access to the policy administrators and the other designated parties authorized to administer email policies for the Internet domain to create, modify, or delete email policies associated with the Internet domain;
    validating email policies for accuracy and consistency as determined by one or more validators provided by the DEA; and
    storing the validated email policies in a policy repository; and
  distributing, via a non-privileged interface, one or more of the validated email policies to email servers configured to enforce email policies on emails from email addresses whose domain portion matches the Internet domain, the domain portion being that part of an email address following the "@" symbol.

12. The method of claim 11, further comprising providing an interactive graphical user interface through which the policy administrators and the other designated parties create, modify, or delete email policies associated with the Internet domain.

13. The method of claim 11, further comprising connecting to an authoritative domain name server of the Internet via APIs to create, modify, or delete at least one DNS record whose domain field specifies the Internet domain.

14. The method of claim 11, further comprising displaying instructions to an administrator of the Internet domain to create, modify, or delete at least one DNS record in an authoritative domain name server of the Internet.

15. The method of claim 11, wherein an email policy distributed by the DEA specifies one or more IP addresses authorized to send emails on behalf of the Internet domain.

16. The method of claim 11, wherein an email policy distributed by the DEA comprises a cryptographic key for authenticating Domain Key Indexed Mail (DKIM) sent by an email server that sends emails on behalf of the Internet domain.

17. The method of claim 11, further comprising distributing at least one email policy directly to an email client, wherein the at least one email policy comprises a public key associated with an email address under the Internet domain.

* * * * *